(12) United States Patent
Sundaram et al.

(10) Patent No.: US 11,411,998 B2
(45) Date of Patent: Aug. 9, 2022

(54) REPUTATION-BASED POLICY IN ENTERPRISE FABRIC ARCHITECTURES

(71) Applicant: Cisco Technology, Inc., San Jose, CA (US)

(72) Inventors: Ganesh Sundaram, Santa Clara, CA (US); Bibhuti Bhusan Kar, Bangalore (IN); Suresh Gopathy, Bangalore (IN); Sudharsan Rangarajan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 465 days.

(21) Appl. No.: 15/968,250

(22) Filed: May 1, 2018

(65) Prior Publication Data
US 2019/0342337 A1 Nov. 7, 2019

(51) Int. Cl.
*H04L 9/40* (2022.01)
*H04L 45/30* (2022.01)

(52) U.S. Cl.
CPC .............. *H04L 63/20* (2013.01); *H04L 45/30* (2013.01); *H04L 63/0227* (2013.01)

(58) Field of Classification Search
CPC ..... H04L 63/20; H04L 63/0227; H04L 45/30; H04L 49/25
See application file for complete search history.

(56) References Cited

U.S. PATENT DOCUMENTS

| | | | |
|---|---|---|---|
| 7,984,294 B1* | 7/2011 | Goringe | H04L 63/20 380/239 |
| 8,443,049 B1* | 5/2013 | Geddes | H04L 63/126 709/207 |
| 8,570,861 B1* | 10/2013 | Brandwine | H04L 45/70 370/230 |
| 10,182,064 B1* | 1/2019 | Agarwal | H04L 63/1416 |
| 10,516,695 B1* | 12/2019 | Evans | H04L 63/1425 |
| 2004/0172557 A1* | 9/2004 | Nakae | H04L 63/0263 726/22 |
| 2005/0081058 A1* | 4/2005 | Chang | H04L 63/0236 726/4 |
| 2007/0130350 A1* | 6/2007 | Alperovitch | H04L 63/168 709/229 |
| 2007/0180495 A1* | 8/2007 | Hardjono | H04W 12/0609 726/3 |
| 2007/0297405 A1* | 12/2007 | He | H04L 45/52 370/389 |
| 2008/0175226 A1* | 7/2008 | Alperovitch | H04L 63/1458 370/352 |

(Continued)

OTHER PUBLICATIONS

"Nakao et al., A Routing Underlay for Overlay Networks, 2003, Proceedings of the ACM SIGCOMM Conference, pp. 1-9" (Year: 2003).*

*Primary Examiner* — Saleh Najjar
*Assistant Examiner* — Nhan Huu Nguyen
(74) *Attorney, Agent, or Firm* — Merchant & Gould P.C.

(57) ABSTRACT

In accordance with various embodiments, a method is performed including determining a plurality of network reputation scores for a respective plurality of network subsets of a fabric network environment and determining a reputation policy for traffic traversing the fabric network environment. The method includes routing traffic traversing the fabric network environment according to the reputation policy and the plurality of network reputation scores.

20 Claims, 5 Drawing Sheets

(56) References Cited

U.S. PATENT DOCUMENTS

| | | | |
|---|---|---|---|
| 2008/0262991 A1* | 10/2008 | Kapoor | H04L 63/14 706/20 |
| 2009/0288135 A1* | 11/2009 | Chang | H04L 63/20 726/1 |
| 2010/0333177 A1* | 12/2010 | Donley | G06F 21/6218 726/4 |
| 2011/0055897 A1* | 3/2011 | Arasaratnam | G06F 21/6218 726/3 |
| 2011/0072508 A1* | 3/2011 | Agarwal | H04L 63/0227 726/13 |
| 2011/0199902 A1* | 8/2011 | Leavy | H04L 43/0876 370/232 |
| 2011/0271007 A1* | 11/2011 | Wang | H04L 45/64 709/238 |
| 2011/0296519 A1* | 12/2011 | Ide | G06F 21/30 726/13 |
| 2012/0027018 A1* | 2/2012 | Ilyadis | H04L 49/70 370/392 |
| 2012/0066492 A1* | 3/2012 | Gamer | H04W 12/0806 713/156 |
| 2012/0084441 A1* | 4/2012 | Alperovitch | H04L 45/02 709/224 |
| 2012/0271890 A1* | 10/2012 | Judge | H04L 51/12 709/206 |
| 2013/0019317 A1* | 1/2013 | Whelan | G01S 1/725 726/26 |
| 2013/0094398 A1* | 4/2013 | Das | H04W 40/246 370/254 |
| 2013/0139245 A1* | 5/2013 | Thomas | H04L 47/32 726/13 |
| 2013/0148653 A1* | 6/2013 | Howard | G06F 16/955 370/389 |
| 2013/0268994 A1* | 10/2013 | Cooper | H04L 63/10 726/1 |
| 2013/0304900 A1* | 11/2013 | Trabelsi | H04L 67/1057 709/224 |
| 2013/0312097 A1* | 11/2013 | Turnbull | H04L 63/145 726/24 |
| 2015/0172314 A1* | 6/2015 | Mononen | H04L 63/1416 726/8 |
| 2015/0281277 A1* | 10/2015 | May | H04L 63/10 726/1 |
| 2016/0043940 A1 | 2/2016 | Mahadevan | H04L 45/566 709/223 |
| 2016/0294858 A1* | 10/2016 | Woolward | H04L 63/20 |
| 2016/0350531 A1* | 12/2016 | Harris | H04L 63/20 |
| 2016/0359673 A1* | 12/2016 | Gupta | H04L 43/026 |
| 2016/0359872 A1* | 12/2016 | Yadav | H04L 43/0894 |
| 2016/0359888 A1* | 12/2016 | Gupta | H04L 1/242 |
| 2016/0359897 A1* | 12/2016 | Yadav | G06F 16/285 |
| 2016/0359917 A1* | 12/2016 | Rao | H04L 41/046 |
| 2016/0381022 A1* | 12/2016 | Jackson | H04L 63/1441 726/7 |
| 2016/0381030 A1* | 12/2016 | Chillappa | H04W 4/70 726/11 |
| 2017/0111364 A1* | 4/2017 | Rawat | H04L 63/1433 |
| 2017/0279773 A1* | 9/2017 | Koripella | H04L 63/1408 |
| 2017/0310579 A1* | 10/2017 | Hayes | H04W 72/0493 |
| 2017/0310693 A1* | 10/2017 | Howard | H04L 63/166 |
| 2018/0131720 A1* | 5/2018 | Hobson | H04L 63/1416 |
| 2018/0191743 A1* | 7/2018 | Reddy | G06N 20/00 |
| 2019/0098023 A1* | 3/2019 | Dinerstein | G06F 21/50 |
| 2019/0158520 A1* | 5/2019 | DiValentin | H04L 63/145 |

* cited by examiner

REPUTATION-BASED POLICY IN ENTERPRISE FABRIC ARCHITECTURES

TECHNICAL FIELD

The present disclosure generally relates generally to reputation-based policy enforcement in data communications, and in particular, reputation-based policy enforcement in data transmitted over fabric networks.

BACKGROUND

In an enterprise fabric network, security is a paramount concern. However, applying policies intended to keep data secure can be challenging and it is desirable that such policies be adaptive to a number of different factors.

BRIEF DESCRIPTION OF THE DRAWINGS

For a better understanding of aspects of the various embodiments described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Various embodiments disclosed herein include devices, systems, and methods for enforcing a reputation-based policy in a fabric network includes determining a plurality of network reputation scores for a respective plurality of network subsets of a fabric network environment and determining a reputation policy for traffic traversing the fabric network environment. The method further includes routing traffic traversing the fabric network environment according to the reputation policy and the plurality of network reputation scores.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

EXAMPLE EMBODIMENTS

Security of data transmitted over a fabric network is an important objective. As the number of hosts (or endpoint devices) in a fabric network increases and the amount of data transmitted between them similarly increases, the opportunity for malicious attacks increases. Too lax of a security policy can result in comprised data, but too strict of a security policy can undesirably bog down communications. Accordingly, in various implementations, a reputation-based security policy is implemented that depends on a variety of reputation factors.

Figure 1:
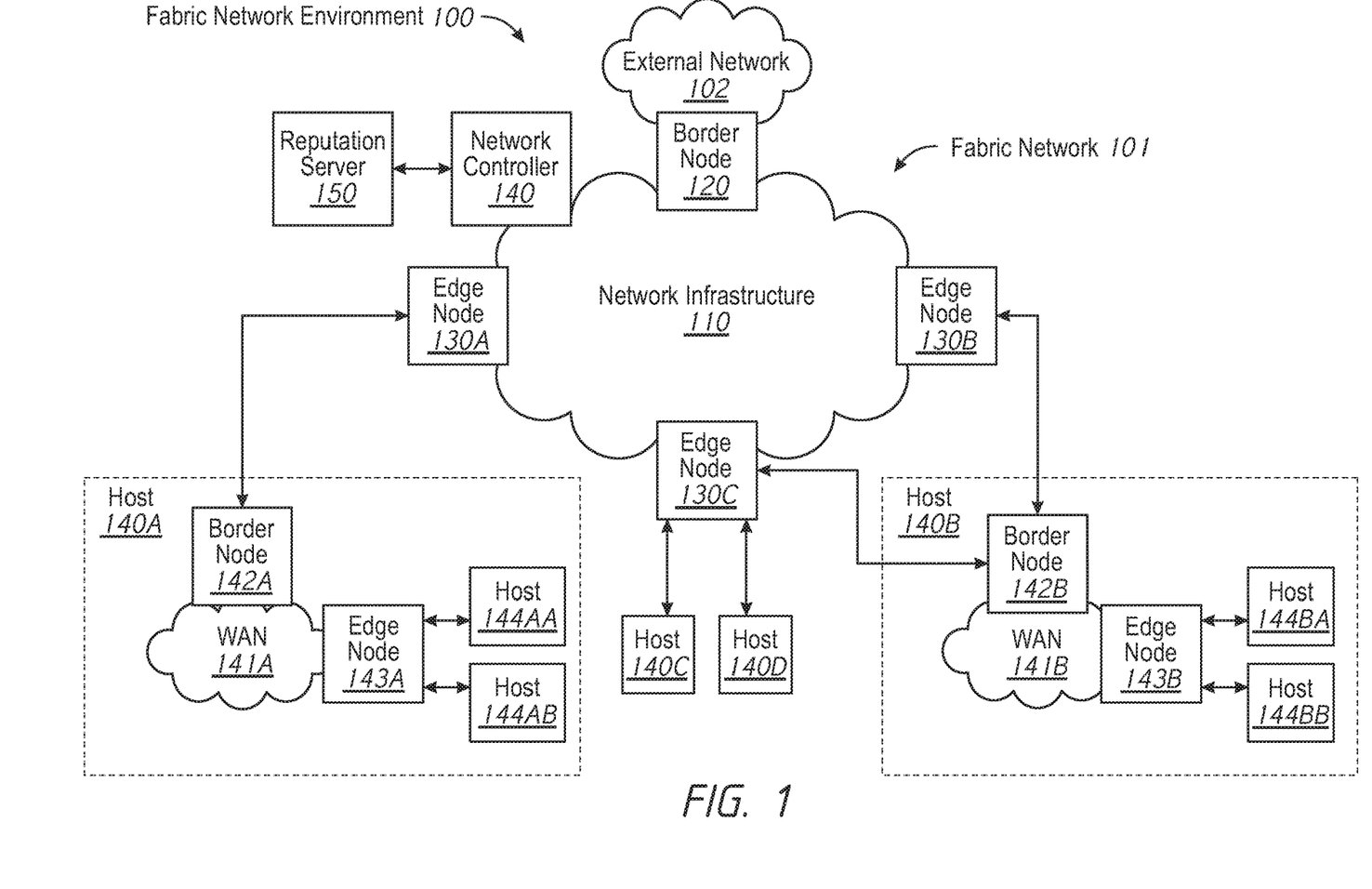
FIG. 1 is a block diagram of a fabric network environment in accordance with some embodiments.

FIG. 1 illustrates a fabric network environment 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the fabric network environment 100 includes a fabric network 101 coupled to one or more external networks 102 and one or more hosts 140A-140D. The fabric network 101 includes one or more border nodes 120 coupled to the one or more external networks 102. Although FIG. 1 illustrates only a single external network 102 and a single border node 120, it is to be appreciated that, in various embodiments, the fabric network 101 includes multiple border nodes coupled to multiple external networks.

In various embodiments, the border node 120 connects the fabric network 101 to traditional Layer-3 networks or other fabric networks (which could be of the same or different type). In various embodiments, the one or more external networks 102 include the internet, a public cloud, or a private cloud (such as a data center cloud or a virtual private cloud). Accordingly, in various embodiments, the border node 120 admits, encapsulates/decapsulates, and forwards traffic to and from the external network 102 connected to the border node 120. In various embodiments, the border node 120 includes a border pair (e.g., a pair of servers or routers acting as a single unit). The border pair can include, for example, a router device that routes traffic to and from the border node 120 and a control plane device that performs control plane functionality.

The fabric network 101 further includes a plurality of edge nodes 130A-130C coupled to the one or more hosts 140A-140D. In various embodiments, one or more of the hosts 140A-140D includes a Layer-2 network, a wireless access point, or an endpoint device connected to a respective edge node 130A-130C. For example, the endpoint device can include a user device, such as a computer, a tablet, a smartphone.

In various embodiments, the edge nodes 130A-130C admit, encapsulate/decapsulate, and forward traffic to and from the hosts 140A-140D connected to the edge nodes 130A-130C. Although the hosts 140A-140D of FIG. 1 are illustrated as directly attached to respective edge nodes 130A-130C, it is to be appreciated that, in some embodiments, one or more of the hosts 140A-140D are coupled to their respective edge nodes 130A-130C via an intermediate Layer-2 network that lies outside the fabric network 101.

In the fabric network environment 100 of FIG. 1, the fabric network 101 includes a first edge node 130A coupled to a first host 140A. The first host 140A includes a fabric network of its own, comprising a border node 142A coupled to an edge node 143A via a first wide-area network (WAN) 141A. The edge node 143A of the first host 140A is coupled to two hosts (e.g., endpoint devices) 144AA and 144AB.

The fabric network 101 includes a second edge node 130B coupled to a second host 140B. The second host 140B includes fabric network of its own, comprising a border node 142B coupled to an edge node 143B via a second wide-area network (WAN) 141B. The edge node 143B of the second host 140B is coupled to two hosts (e.g., endpoint devices) 144BA and 144BB.

Although the first host 140A and second host 140B are illustrated as fabric networks including only a single border node and a single edge node, it is to be appreciated that either of the underlying fabric networks can include multiple border nodes and/or edge nodes.

The fabric network 101 includes a third edge node 130C coupled to a third host 140C, a fourth host 140D, and the second host 140B.

The fabric network 101 further includes a network infrastructure 110 including one or more interconnected intermediate nodes (e.g., switches or routers) that couple the border node 120 to the edge nodes 130A-130C (and the edge nodes 130A-130C to each other). In various embodiments, the interconnected intermediate nodes provide the Layer-3 underlay transport service to fabric traffic. Thus, the interconnected intermediate nodes are Layer-3 forwarders that interconnect the edge nodes 130A-130C and the border node 120. In some embodiments, the intermediate nodes may be capable of inspecting the fabric metadata and could apply policies based on the fabric metadata. However, in various embodiments, all policy enforcement is performed by the edge nodes 130A-130C and the border node 120.

Accordingly, in various embodiments, the fabric network 101 implements a network topology where data traffic is passed through interconnecting switches, while providing the abstraction of a single Layer-2 and/or Layer-3 device. In various embodiments, the fabric network 101 uses IPoverlay, which makes the fabric network 101 appear like a single virtual router/switch without the use of clustering technologies. In various embodiments, the fabric network 101 provides seamless connectivity, independent of physical topology, with policy application and enforcement at the edges of the fabric (e.g., at the edge nodes 130A-130C and/or the border node 120).

The fabric network 101 further includes a network controller 140 which, among other things, establishes and manages the fabric network 101, including policy definition. The network controller 140 is coupled to a reputation server 150 that stores information regarding the reputation of various entities within the fabric network environment 100. In various embodiments, the information regarding reputation is stored in the form of one or more reputation scores, e.g., a 4-bit value ranging from 0 to 10, where 0 is associated with a low reputation score and 10 is associated with a high reputation score.

In various embodiments, the reputation server 150 stores a reputation score for various locations or sites within the fabric network environment 100. In various embodiments, the reputation server 150 assigns a reputation score to a location based on the underlying IP address used for WAN interfaces using Geo-IP. For example, the reputation server 150 can store information regarding (1) a first site embodied by the connection between the edge node 143A and hosts 144AA-144AB of the first host 140A, (2) a second site embodied by the connection between the first edge node 130A and the first host 140A, (3) a third site embodied by the connection between the second edge node 130B and the second host 140B, (4) a fourth site embodied by the connection between the edge node 143B and hosts 144BA-144B of the second host 140B, (5) a fifth site embodied by the connection between the third edge node 130B and the second host 140B, and (6) a sixth site embodied by the connection between the edge node 130B and the third and fourth hosts 140C-140D.

Figure 2A:
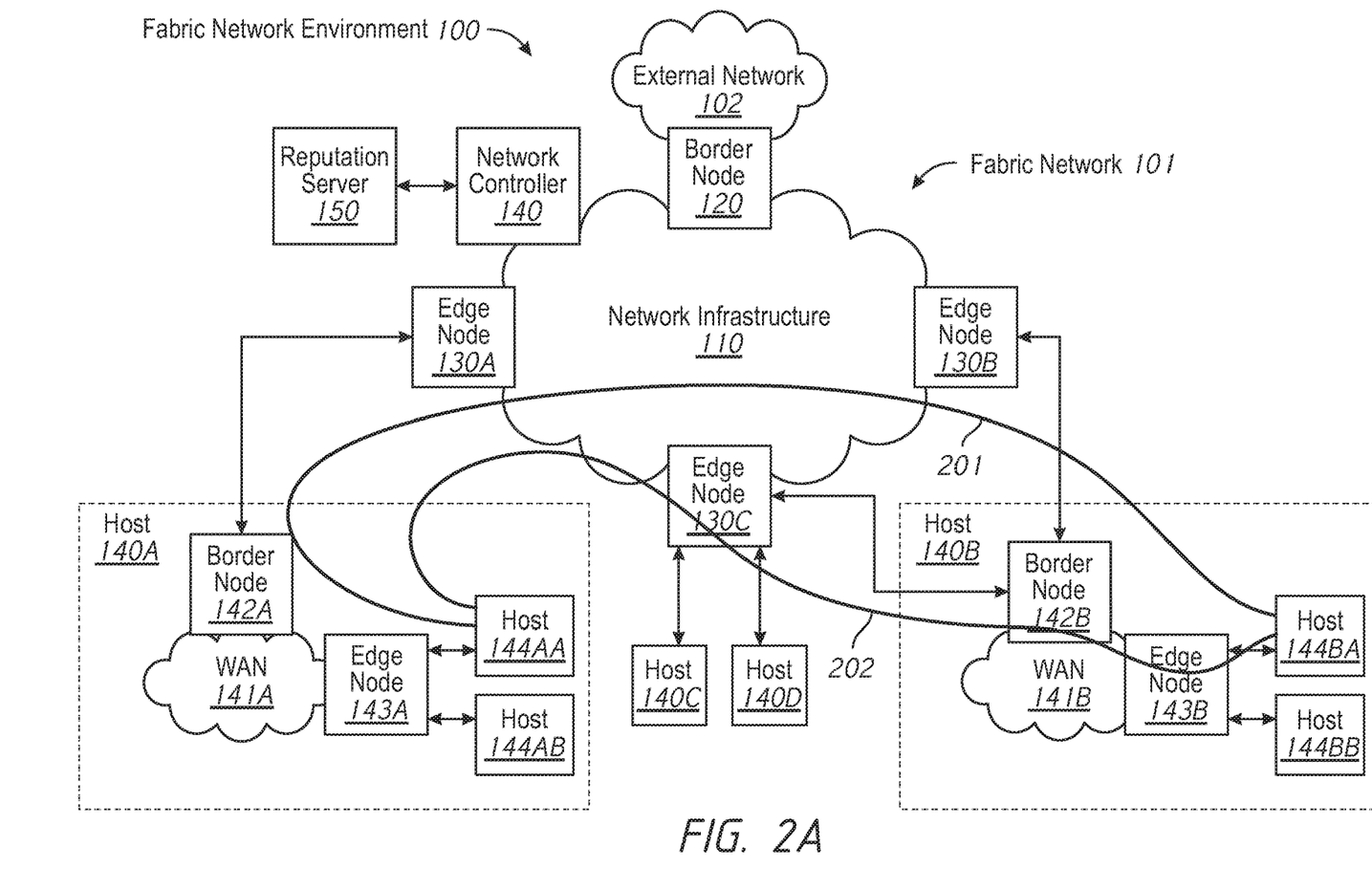
FIGS. 2A-2B are flow diagrams of a method of generating a shared secret in accordance with some embodiments.

FIG. 2A illustrates the fabric network environment 100 of FIG. 1 with two paths 201-202 for data between two hosts 144AA and 144BA. As an example, the network controller 140 enforces a policy that data from a particular application (e.g., a financial application) not traverse a site with a reputation score lower than 5. However, data from other applications can traverse any site. In this example, the third site embodied by the connection between the second edge node 130B and the second host 140B has a reputation score of 3. Accordingly, data not from the particular application between the host 144AA and the host 144BA traverses the first path 201 which includes the third site. Conversely, data from the particular application between the host 144AA and the host 144BA traverses the second path 202 which does not include the third site.

In various embodiments, the reputation server 150 stores a reputation score for various networks within the fabric network environment 100, such as networks provided by different Internet Service Providers (ISPs). In various embodiments, the reputation score for various networks is separate from the reputation score for various locations. For example, in the same location, if there are two ISPs, but one ISP is using equipment that could be tampered by state actors, or hosts a lot of malicious websites, that ISP would have a lower reputation score.

Figure 2B:
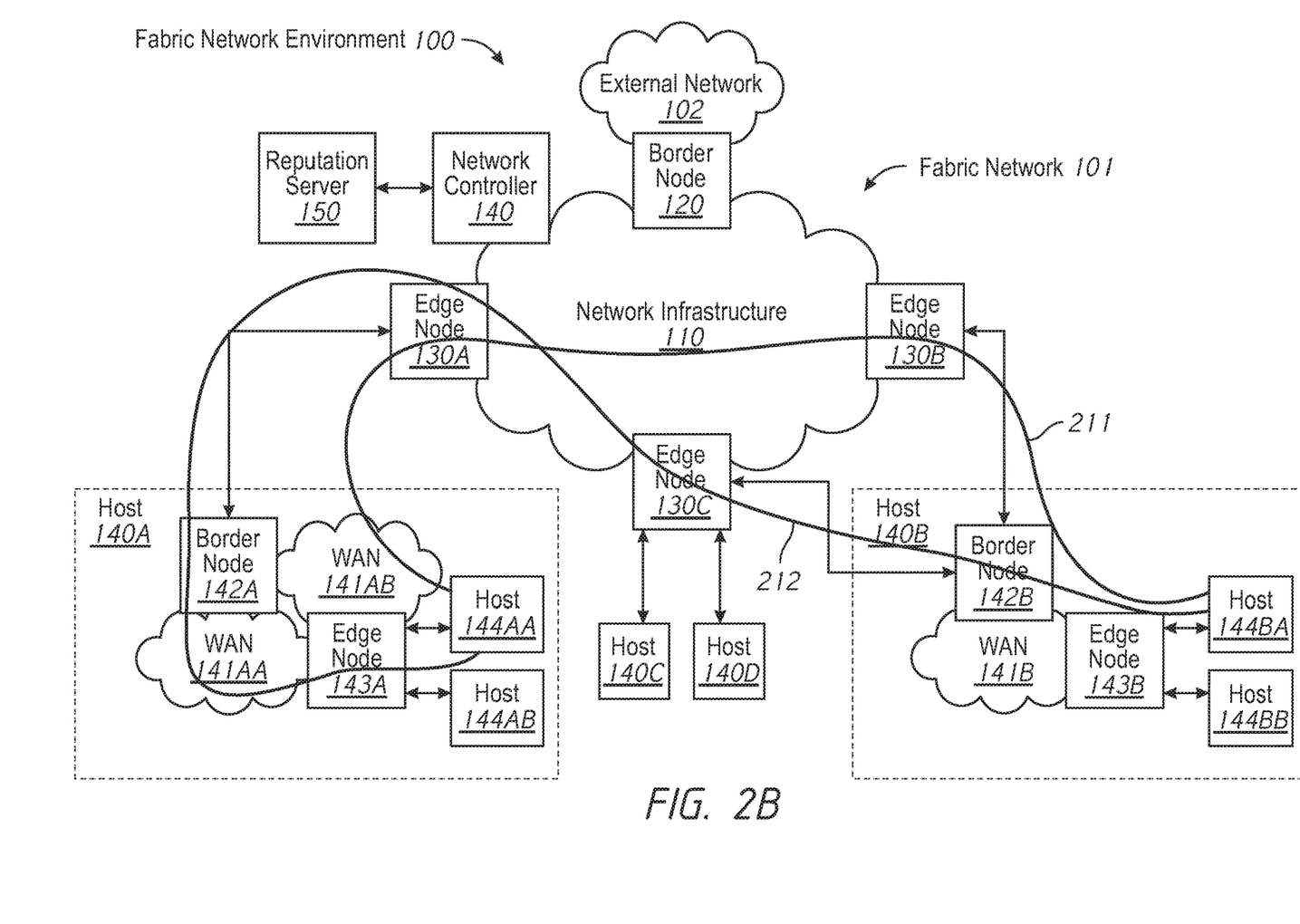

FIG. 2B illustrates the fabric network environment 100 of FIG. 1 with two paths 211-212 for data between two hosts 144AA and 144BA. The WAN 141A is separated into two WANs 141AA and 141AB provided by two different ISPs and with two different reputation scores. As an example, the network controller 140 enforces a policy that data from a particular application (e.g., a financial application) not traverse a network with a reputation score lower than 5. However, data from other applications can traverse any network. In this example, the first WAN 141AA has a reputation score of 3 and the second WAN 141AB has a reputation score of 7. Accordingly, data not from the particular application between the host 144AA and the host 144BA traverses the first path 211 which includes the second WAN 141AB. Conversely, data from the particular application between the host 144AA and the host 144BA traverses the second path 212 which does not include the second WAN 141AB, but rather, includes the first WAN 141AA.

In various embodiments, the reputation server 150 stores a reputation score for various networks within the fabric network environment 100, such as networks provided by different ISPs. In various embodiments, the reputation score for various networks is separate from the reputation score for various locations. For example, in the same location, if there are two ISPs, but one ISP is using equipment that could be tampered by state actors, or hosts a lot of malicious websites, that ISP would have a lower reputation score.

In various embodiments, the reputation server 150 stores a reputation score for various applications used within the fabric network environment 100. In various embodiments, the reputation server 150 stores a reputation score for various devices coupled to the fabric network environment 100. These reputation scores, in addition to those described above, can be used by the network controller 140 to apply one or more reputation policies as described further below.

Figure 3:
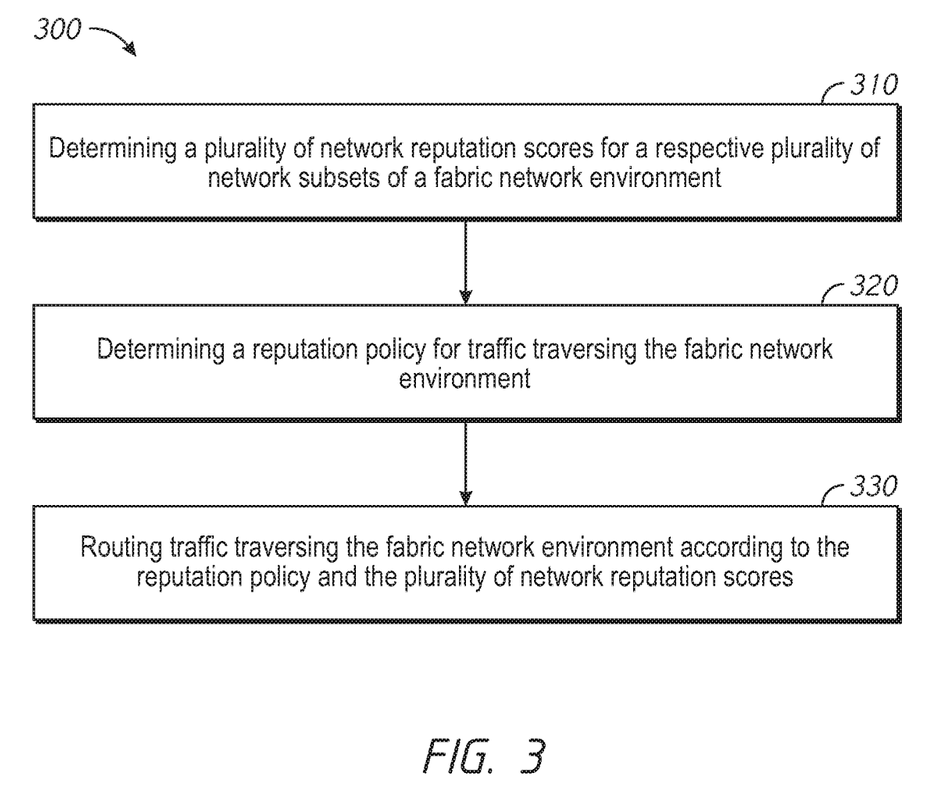
FIG. 3 is a flowchart representation of a method of encrypting and transmitting data from a source host to a destination host via a fabric network in accordance with some embodiments.

FIG. 3 is a flowchart representation of a method 300 of enforcing a reputation-based policy in a fabric network environment in accordance with some embodiments. In some embodiments (and as detailed below as an example), the method 300 is performed by an overlay node of a fabric network environment, such as an edge node or border node of a fabric network in the fabric network environment, such as one of the border node 120 or border nodes 142A-142B or edge nodes 130A-130C or edge nodes 143A-143B of FIG. 1, or a portion thereof. In some embodiments, the method 300 is performed by a reputation server or network controller, such as reputation server 150 or network controller 140 of FIG. 1, or a portion thereof. In some embodiments, the method 300 is performed by processing logic, including hardware, firmware, software, or a combination thereof. In some embodiments, the method 300 is performed by a processor executing code stored in a non-transitory computer-readable medium (e.g., a memory). Briefly, the method 300 includes determining a plurality of network reputation scores and a reputation policy and routing traffic traversing the fabric network environment according to the network reputation scores and the reputation policy.

The method 300 begins, in block 310, with the overlay node determining a plurality of reputation scores for a respective plurality of network subsets of the fabric network environment. In various embodiments, at least one of the plurality of reputation scores for one of the respective plurality of network subsets is based on a geographical location of the one of the plurality of respective plurality of networks subsets. For example, as described above with respect to FIG. 2A, the reputation scores include scores for (1) a first network subset at a geographical location of the connection between the edge node 143A and hosts 144AA-144AB of the first host 140A, (2) a second network subset at a geographical location embodied by the connection between the first edge node 130A and the first host 140A, (3) a third network subset at a geographical location of the connection between the second edge node 130B and the second host 140B, (4) a fourth network subset at a geographical location of the connection between the edge node 143B and hosts 144BA-144B of the second host 140B, (5) a fifth network subset at a geographical location of the connection between the third edge node 130B and the second host 140B, and (6) a sixth network subset at a geographical location of the connection between the edge node 130B and the third and fourth hosts 140C-140D. In various embodiments, at least one of the plurality of reputation scores for one of the respective plurality of network subsets is based on a service provider of the one of the plurality of respective plurality of networks subsets. For example, as described above with respect to FIG. 2B, the reputation scores includes scores for (1) a first WAN 141AA provided by a first service provider and (2) a second WAN 141AB provided by a second service provider.

In various embodiments, determining the plurality of network reputation scores includes receiving at least one of the plurality of network reputation scores in an overlay header. Accordingly, in various embodiments, the network reputation scores are available for overlay points to act upon based on the policies (as described below), but none of the intermediate underlay hops would access the network reputation scores because underlay hops do not inspect the overlay header.

In various embodiments, in addition to determining the plurality of network reputation scores, the overlay node determines a plurality of device reputation scores for a respective plurality of devices of the fabric network environment. In various embodiments, the device reputation scores are determined based on the operating system version, antivirus/firewall version, or malware presence associated with an IP address.

The method 300 continues, in block 320, with the overlay node determining a reputation policy for traffic traversing the fabric network environment. In various embodiments, the reputation policy is received by the overlay node from a network controller.

The method 300 continues, in block 330, with the overlay node routing traffic traversing the fabric network environment according to the reputation policy and the plurality of network reputation scores. In various embodiments, the reputation policy for traffic traversing the fabric network specifies a minimum reputation score and routing traffic traversing the fabric network environment includes routing traffic through network subsets of the plurality of network subsets having a reputation score greater than the minimum reputation score. For example, in FIGS. 2A and 2B, traffic associated with a particular application is routed through network subsets having a reputation score higher than 5. In various embodiments, the reputation policy for traffic traversing the fabric network specifies a maximum reputation score and routing traffic traversing the fabric network environment includes routing traffic generated through network subsets of the plurality of network subsets having a reputation score less than the maximum reputation score. For example, traffic associated with a particular application (e.g., a high-risk, low-reputation application) can be routed through lower-reputation network subsets to effect a separation of high-risk traffic and high-security traffic.

In various embodiments, the reputation policy for traffic traversing the fabric network specifies an application and routing traffic traversing the fabric network environment includes routing traffic generated by the application according to the reputation policy and the plurality of network reputation scores. For example, in FIGS. 2A and 2B, traffic associated with a particular application is routed differently than traffic from other applications.

In various embodiments, routing the traffic traversing the fabric network environment includes routing the traffic to a scrubber in accordance with the reputation policy and the plurality of network reputation scores. For example, if traffic is passed through (or originates from) a network subset with a low network reputation score (or originates from a device with a low device reputation score or high-risk application with a low application reputation score), the reputation policy may specify that the traffic by routed to a scrubber before reaching its destination.

In various embodiments, following block 330, the method 300 returns to block 310 where the overlay node determines an updated plurality of network reputation scores for the respective plurality of network subsets of a fabric network environment. In various embodiments, the updated plurality of network reputation scores are received by the overlay node (e.g., from a reputation server via a network controller in an overlay header) based on one or more network events occurring in the fabric network environment. Accordingly, the reputation scores are adaptive based on the network events that are reported to the reputation server. The method 300 continues again to block 320 and block 330 where the overlay node routing additional traffic traversing the fabric network environment according to the reputation policy (or an updated reputation policy) and the updated plurality of network reputation scores.

Figure 4:
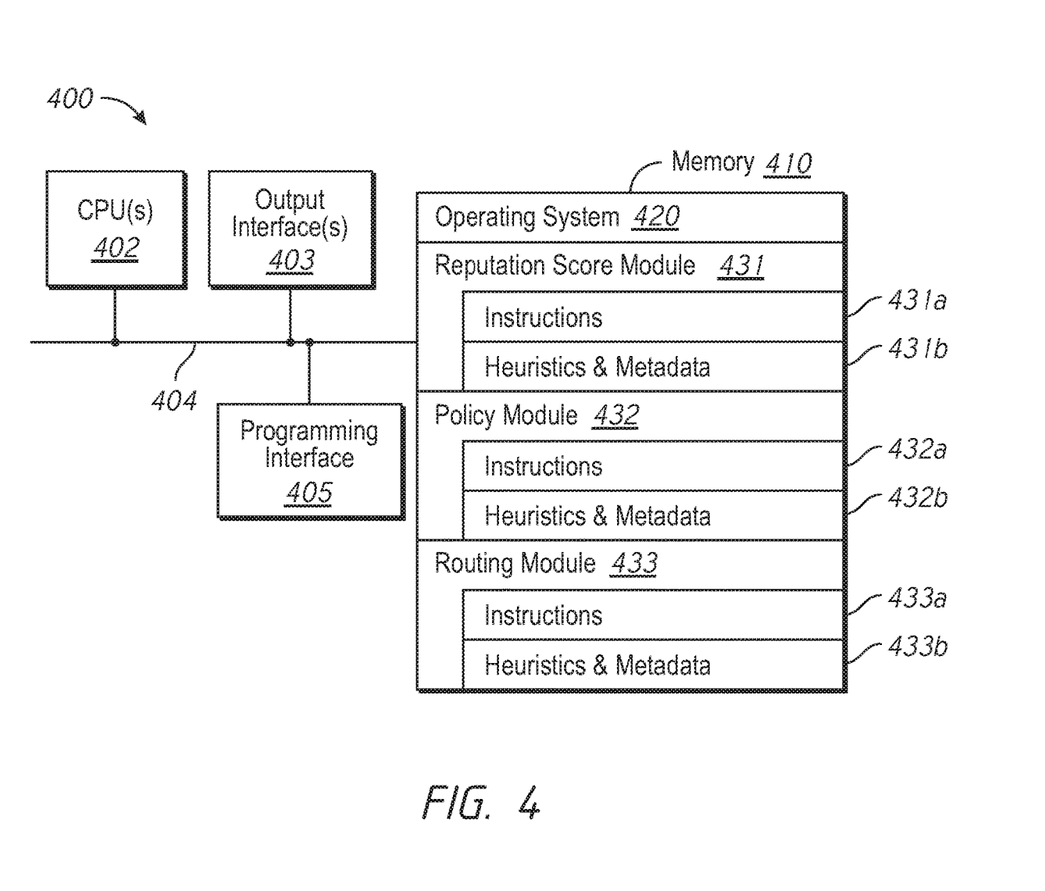
FIG. 4 is a block diagram of an example device in accordance with some embodiments.

FIG. 4 is a block diagram of an example device 400 in accordance with some embodiments. In some embodiments, the device corresponds to one of the edge nodes 130A-130C, the border node 120, or one of the hosts 140A-140D (or portions thereof) of FIG. 1 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some embodiments, the communication buses 404 include circuitry that interconnects and controls communications between system components. The memory 410 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some embodiments, the memory 410 or the non-transitory computer readable storage medium of the memory 410 stores the following programs, modules and data structures, or a subset thereof including an optional operating system 420, a reputation score module 431, a policy module 432, and a routing module 433. In some embodiments, one or more instructions are included in a combination of logic and non-transitory memory. The operating system 420 includes procedures for handling various basic system services and for performing hardware dependent tasks.

In some embodiments, the reputation score module 431 is configured to determine a plurality of network reputation scores for a respective plurality of network subsets of a fabric network environment. To that end, the reputation score module 431 includes a set of instructions 431a and heuristics and metadata 431b.

In some embodiments, the policy module 432 is configured to determine a reputation policy for traffic traversing the fabric network environment. To that end, the interface module 432 includes a set of instructions 432a and heuristics and metadata 432b.

In some embodiments, the routing module 433 is configured to route traffic traversing the fabric network environment according to the reputation policy and the plurality of network reputation scores. To that end, the shared secret generation module 433 includes a set of instructions 433a and heuristics and metadata 433b.

Although the reputation score module 431, the policy module 432, and the routing module 433 are illustrated as residing on a single device 400, it should be understood that in other embodiments, any combination of the reputation score module 431, the policy module 432, and the routing module 433 can reside in separate devices. For example, in some embodiments, each of the reputation score module 431, the policy module 432, and the routing module 433 reside in a separate device.

Moreover, FIG. 4 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining a plurality of network reputation scores for a respective plurality of network subsets of a fabric network environment;
   determining a reputation policy for traffic traversing the fabric network environment; and
   routing traffic traversing the fabric network environment according to the reputation policy and the plurality of network reputation scores, wherein the reputation policy for traffic traversing the fabric network specifies a minimum reputation score and a maximum reputation score, wherein routing the traffic traversing the fabric network environment according to the reputation policy and the plurality of network reputation scores comprises routing the traffic through network subsets of the plurality of network subsets having a reputation score greater than the minimum reputation score and less than the maximum reputation score, wherein the plurality of network reputation scores are received in an overlay header at an edge node of the fabric network environment comprising a plurality intermediate devices connecting the edge node to another edge node through underlay hops and presented as a single routing device, wherein the underlay hops of the fabric network environment do not have access to the plurality of network reputation scores, and wherein the underlay hops do not inspect the overlay header.

2. The method of claim 1, wherein at least one of the plurality of reputation scores for one of the respective plurality of network subsets is based on a geographical location of the one of the plurality of respective plurality of networks subsets.

3. The method of claim 1, wherein at least one of the plurality of reputation scores for one of the respective plurality of network subsets is based on a service provider of the one of the plurality of respective plurality of networks subsets.

4. The method of claim 1, further comprising determining a plurality of device reputation scores for a respective plurality of devices of the fabric network environment, wherein routing traffic traversing the fabric network environment is further performed according to the plurality of device reputation scores.

5. The method of claim 1, wherein the reputation policy for traffic traversing the fabric network specifies an application and routing traffic traversing the fabric network environment includes routing traffic generated by the application according to the reputation policy and the plurality of network reputation scores.

6. The method of claim 1, wherein routing the traffic traversing the fabric network environment includes routing the traffic to a scrubber in accordance with the reputation policy and the plurality of network reputation scores.

7. The method of claim 1, further comprising:
   determining an updated plurality of network reputation scores for the respective plurality of network subsets of a fabric network environment; and
   routing additional traffic traversing the fabric network environment according to the reputation policy and the updated plurality of network reputation scores.

8. An electronic device comprising:
   a memory device; and
   a processor connected to the memory device, wherein the processor is configured to:
   determine a plurality of network reputation scores for a respective plurality of network subsets of a fabric network environment;
   determine a reputation policy for traffic traversing the fabric network environment; and
   route traffic traversing the fabric network environment according to the reputation policy and the plurality of network reputation scores, wherein the reputation policy for traffic traversing the fabric network specifies a minimum reputation score and a maximum reputation score, wherein the processor being configured to route the traffic traversing the fabric network environment according to the reputation policy and the plurality of network reputation scores comprises the processor being operative to route the traffic through network subsets of the plurality of network subsets having a reputation score greater than the minimum reputation score and less than the maximum reputation score, wherein the plurality of network reputation scores are received in an overlay header at an edge node of the fabric network environment comprising a plurality intermediate devices connecting the edge node to another edge node through underlay hops and presented as a single routing device, wherein the underlay hops of the fabric network environment do not have access to the plurality of network reputation scores, and wherein the underlay hops do not inspect the overlay header.

9. The electronic device of claim 8, wherein at least one of the plurality of reputation scores for one of the respective plurality of network subsets is based on a geographical location of the one of the plurality of respective plurality of networks subsets.

10. The electronic device of claim 8, wherein at least one of the plurality of reputation scores for one of the respective plurality of network subsets is based on a service provider of the one of the plurality of respective plurality of networks subsets.

11. The electronic device of claim 8, wherein the processor is further configured to determine a plurality of device reputation scores for a respective plurality of devices of the fabric network environment and to route the traffic traversing the fabric network environment based on the plurality of device reputation scores.

12. The electronic device of claim 8, wherein the reputation policy for traffic traversing the fabric network specifies an application and the processor is configured to route the traffic traversing the fabric network environment by routing traffic generated by the application according to the reputation policy and the plurality of network reputation scores.

13. A non-transitory computer-readable medium encoding instructions which, when executed by a processor perform a method comprising:

determining a plurality of network reputation scores for a respective plurality of network subsets of a fabric network environment;

determining a reputation policy for traffic traversing the fabric network environment; and routing traffic traversing the fabric network environment according to the reputation policy and the plurality of network reputation scores, wherein the reputation policy for traffic traversing the fabric network specifies a minimum reputation score and a maximum reputation score, wherein routing the traffic traversing the fabric network environment according to the reputation policy and the plurality of network reputation scores comprises routing the traffic through network subsets of the plurality of network subsets having a reputation score greater than the minimum reputation score and less than the maximum reputation score, wherein the plurality of network reputation scores are received in an overlay header at an edge node of the fabric network environment comprising a plurality intermediate devices connecting the edge node to another edge node through underlay hops and presented as a single routing device, wherein the underlay hops of the fabric network environment do not have access to the plurality of network reputation scores, and wherein the underlay hops do not inspect the overlay header.

14. The non-transitory computer-readable medium of claim 13, wherein at least one of the plurality of reputation scores for one of the respective plurality of network subsets is based on a geographical location of the one of the plurality of respective plurality of networks subsets.

15. The non-transitory computer-readable medium of claim 13, wherein at least one of the plurality of reputation scores for one of the respective plurality of network subsets is based on a service provider of the one of the plurality of respective plurality of networks subsets.

16. The non-transitory computer-readable medium of claim 13, wherein the method further comprising determining a plurality of device reputation scores for a respective plurality of devices of the fabric network environment and route traffic traversing the fabric network environment according to the plurality of device reputation scores.

17. The non-transitory computer-readable medium of claim 13, wherein the reputation policy for traffic traversing the fabric network specifies an application and routing traffic traversing the fabric network environment includes routing traffic generated by the application according to the reputation policy and the plurality of network reputation scores.

18. The non-transitory computer-readable medium of claim 13, wherein routing the traffic traversing the fabric network environment includes routing the traffic to a scrubber in accordance with the reputation policy and the plurality of network reputation scores.

19. The non-transitory computer-readable medium of claim 13, wherein determining the plurality of network reputation scores for the respective plurality of network subsets further comprises updating the plurality of network reputation scores for the respective plurality of network subsets in response to detecting a network event in the fabric network, wherein the plurality of network reputation scores are adaptive based on network events.

20. The non-transitory computer-readable medium of claim 13, wherein a first reputation score assigned to a first network subset located at a first geographical location and associated with a first service provider is different from a second reputation score assigned to a second network subset located at the first geographical location and associated with a second service provider.

* * * * *